United States Patent
Iseki

(10) Patent No.: US 6,867,277 B2
(45) Date of Patent: Mar. 15, 2005

(54) ETHYLENE-BASED POLYMER RESIN

(75) Inventor: Yuki Iseki, Sodegaura (JP)

(73) Assignee: Sumitomo Chemical Company, Limited, Osaka (JP)

(*) Notice: Subject to any disclaimer, the term of this patent is extended or adjusted under 35 U.S.C. 154(b) by 0 days.

(21) Appl. No.: 10/397,188

(22) Filed: Mar. 27, 2003

(65) Prior Publication Data

US 2004/0030082 A1 Feb. 12, 2004

(30) Foreign Application Priority Data

Mar. 28, 2002 (JP) ........................................ 2002-090973

(51) Int. Cl.$^7$ .............................................. C08F 210/14
(52) U.S. Cl. ................................ 526/348.3; 526/348.2; 526/348.4; 526/348.5; 526/348.6
(58) Field of Search ........................... 526/348.2, 348.3, 526/348.4, 348.5, 348.6

(56) References Cited

U.S. PATENT DOCUMENTS

| 5,374,700 A | 12/1994 | Tsutsui et al. |
| 5,451,106 A | 9/1995 | Nguyen et al. |
| 5,459,217 A * | 10/1995 | Todo et al. ............... 526/348.1 |
| 5,840,815 A | 11/1998 | Tsutsui et al. |
| 2002/0198341 A1 * | 12/2002 | Takahashi ................... 526/160 |

FOREIGN PATENT DOCUMENTS

| JP | 4-213309 A | 8/1992 |
| JP | 6-9724 A | 1/1994 |

* cited by examiner

Primary Examiner—Fred Teskin
(74) Attorney, Agent, or Firm—Sughrue Mion, PLLC

(57) ABSTRACT

An ethylene-based polymer resin which is obtained by copolymerizing ethylene with an α-olefin having 5 to 20 carbon atoms, and has a melt flow rate (MFR) measured at 190° C. under a load of 21.18 N according to JIS K7210-1995, of not less than 0.01 g/10 min. and less than 1 g/10 min., wherein the melt flow rate and a melt tension(MT) at 190° C. (unit: cN) of the resin satisfy a relation of the following expression (1) and an intrinsic viscosity [η] (unit: dL/g) and the melt flow rate of the resin satisfy a relation of the following expression (2):

$$2 \times MFR^{-0.59} < MT < 3.6 \times MFR^{-0.66} \quad (1)$$

$$1.02 \times MFR^{-0.094} < [\eta] < 1.50 \times MFR^{-0.156} \quad (2).$$

9 Claims, No Drawings

ETHYLENE-BASED POLYMER RESIN

BACKGROUND OF THE INVENTION

1. Field of the Invention

The present invention relates to an ethylene-based polymer resin excellent in balance of extrusion moldability, mechanical strength and appearance of extruded molded article.

2. Description of Related Art

Ethylene-based polymer resins have been used in a variety of fields as a general purpose type resin, and are required to have mechanical properties such as, for example, impact strength, appearance of extruded articles such as film and sheet, such as surface smoothness, gloss and transparency, in addition to extrusion moldability such as, for example, extrusion torque, melt tension and high speed processability. A low density polyethylene obtained by a high pressure radical polymerization method has defects that molding at high speed is difficult because of too high melt tension though balance between extrusion torque and melt tension is excellent, further, that impact strength is low. On the other hand, regarding a conventional linear low density polyethylene using an α-olefin such as 1-butene or 1-hexene as a copolymerization component with ethylene, methods of increasing molecular weight and decreasing density for improving mechanical strength and methods of increasing molecular weight for improving melt tension, are envisaged, however, these are not suitable methods since deterioration in moldability due to increase in extrusion torque during molding and deterioration in rigidity and heat resistance, is invited.

JP-A-04-213309 discloses a polyethylene copolymer having an extremely high melt tension, however, it has defects that high speed hauling off is difficult due to too high melt tension and consequently molding speed is restricted, therefore, it can not be said that requirements are satisfied. JP-A-06-9724 discloses an ethylene copolymer having relatively low melt tension, however, it has a narrow molecular weight distribution and its flowability is not admitted as sufficiently excellent, and also in relation between melt index and intrinsic viscosity, it is rather nearer to conventional linear low density polyethylenes than high pressure processed low density polyethylenes excellent in processability, not sufficiently satisfying conventional requirements in moldability. Therefore, it is extremely difficult to enable even molding at high speed with improving mechanical strength and melt tension while suppressing increase in extrusion torque during molding and decrease in rigidity, and development of such resins is strongly desired. Further, molded articles such as films obtained from such resins not only manifest extremely easy molding but also show excellent mechanical properties and appearance such as surface smoothness, gloss and transparency of extruded articles such as film and sheet, therefore, practical utilization thereof is strongly desired.

SUMMARY OF THE INVENTION

An object of the present invention is to provide an ethylene-based polymer resin excellent in balance of extrusion moldability, mechanical strength and appearance of extruded molded article.

Namely, the present invention provides an ethylene-based polymer resin obtained by copolymerizing ethylene with an α-olefin having 5 to 20 carbon atoms, wherein a melt flow rate (MFR) measured at 190° C. under 21.18N according to JIS K7210-1995(unit: g/10 min.) and a melt tension at 190° C. (MT) (unit: cN) satisfy a relation of the following expression (1), and an intrinsic viscosity [η] (unit: dL/g) and the above-mentioned MFR satisfy a relation of the following expression (2).

$$2 \times MFR^{-0.59} < MT < 3.6 \times MFR^{-0.66} \quad (1)$$

$$1.02 \times MFR^{-0.094} < [\eta] < 1.50 \times MFR^{-0.156} \quad (2)$$

DETAILED DESCRIPTION OF THE INVENTION

The ethylene-based polymer resin of the present invention is preferably a thermoplastic resin obtained by copolymerizing ethylene with an α-olefin having 5 to 20 carbon atoms, and has a polyethylene crystal structure. The ethylene-based polymer resin is more preferably a thermoplastic ethylene-based polymer resin containing 50% by weight or more of repeating units derived from ethylene, and is a copolymer of ethylene with an α-olefin having 5 to 10, further preferably 6–10 carbon atoms.

Examples of the α-olefin includes 4-methyl-1-pentene, 1-hexene, 1-octene and 1-decene. In the ethylene-based polymer resin, monomers other than the above-mentioned monomers may be copolymerized. Examples of the other monomers include propylene, 1-butene, conjugated dienes (e.g. butadiene, isoprene), non-conjugated dienes (e.g. 1,4-pentadiene), acrylic acid, acrylates (e.g. methyl acrylate, ethyl acrylate), methacrylic acid, methacrylates (e.g. methyl methacrylate, ethyl methacrylate) and vinyl acetate.

The ethylene-based polymer resin of the present invention is preferably a copolymer of ethylene with an α-olefin having 5 to 20 carbon atoms, more preferably a copolymer of ethylene with an α-olefin having 5 to 10, further preferably 6 to 10 carbon atoms. Examples thereof include, for example, an ethylene-1-hexene copolymer, ethylene-4-methyl-1-pentene copolymer and ethylene-1-octene copolymer, and among them, the ethylene-1-hexene copolymer is more preferable.

Also preferable is a ternary copolymer of ethylene with an α-olefin having 6 to 10 carbon atoms and 1-butene. Examples thereof include, for example, an ethylene-1-butene-1-hexene copolymer, ethylene-1-butene-4-methyl-1-pentene copolymer and ethylene-1-butene-1-octene copolymer, and an ethylene-1-butene-1-hexene copolymer is more preferable.

In the ethylene-based polymer resins, it is generally known that a flowability increases with increase of MFR, namely a melt tension decreases with decrease of a melt viscosity. It is supposed that the ethylene-based polymer resin of the present invention has a polymer structure such a long chain branch, and the melt tension of the resin of the present invention is higher than that of an ethylene polymer not having the polymer structure. Further, since it is supposed that the polymer structure such the long chain branch is relatively simple, the ethylene-based polymer resin of the present invention has a suitable range of a melt tension which is lower than a melt tension of which a low density polyethylene obtained by a high pressure radical polymerization method has, and the melt flow rate (MFR; unit is g/10 min.) and the melt tension at 190° C. (MT; unit is cN) satisfy a relation of the following expression (1).

$$2 \times MFR^{-0.59} < MT < 3.6 \times MFR^{-0.66} \quad (1)$$

When the melt tension is less than $2 \times MFR^{-0.59}$ in expression (1), a moldability becomes poor, and when the melt tension is more than $3.6 \times MFR^{-0.66}$, hauling off at high speed becomes difficult. The ethylene-based polymer resin of the present invention satisfies the above-mentioned relation of the expression (1), and is excellent in moldability including high speed moldability. As the relation expression satisfied by the ethylene-based polymer resin of the present invention, $$2.2 \times MFR^{-0.59} < MT < 3.4 \times MFR^{-0.66}$$

is preferable, and $$2.5 \times MFR^{-0.59} < MT < 3.2 \times MFR^{-0.66}$$

is further preferable.

The melt flow rate (MFR; unit is g/10 min.) used here means a value measured at 190° C. under a load of 21.18 N (2.16 Kg) according to JIS K7210-1995. Further, the melt tension (MT; unit is cN) is a tension value immediately before snapping of a strand when a melt resin strand is extruded through an orifice having a diameter of 2.09 mm$\phi$ and a length of 8 mm by a piston of 190° C. at an extrusion speed of 5.5 mm/min. using a melt tension tester sold by Toyo Seiki Seisakusho K.K. and this strand is wound while increasing the rotation speed at a rate of 40 rpm per minute using a roller having a diameter of 50 mm.

The maximum taking up velocity (MTV; unit is m/min.) is an index of high speed moldability, and means a strand taking up velocity immediately before snapping of the above-mentioned strand.

In ethylene-based polymer resins, it is also known generally that a flowability increases with increase of MFR, namely, an intrinsic viscosity decreases with a decrease of the melt viscosity.

The ethylene-based polymer resin of the present invention has a suitable range of the intrinsic viscosity which is lower than that of conventional ethylene-based polymer resins, and the intrinsic viscosity $[\eta]$ (unit: dl/g) and the above-mentioned MFR satisfy a relation of the following expression (2).

$$1.02 \times MFR^{-0.094} < [\eta] < 1.50 \times MFR^{-0.156} \quad (2)$$

When the intrinsic viscosity $[\eta]$ is more than $1.50 \times MFR^{-0.156}$, extrusion torque is high and moldability is poor, and when less than $1.02 \times MFR^{-0.094}$, impact strength decreases, undesirably. A low density polyethylene obtained by a high pressure radical polymerization method usually satisfies a relation of $[\eta] < 0.96 \times MFR^{-0.094}$, and a conventional copolymer resin of ethylene with an $\alpha$-olefin usually satisfies a relation of $[\eta] > 1.6 \times MFR^{-0.156}$.

The ethylene-based polymer resin of the present invention satisfies the above-mentioned relation of the expression (2), and excellent in moldability such as low extrusion torque. As the relation expression satisfied by the ethylene-based polymer resin of the present invention, $$1.05 \times MFR^{-0.094} < [\eta] < 1.47 \times MFR^{-0.156}$$

is preferable, and $$1.08 \times MFR^{-0.094} < [\eta] < 1.42 \times MFR^{-0.156}$$

is further preferable.

Regarding the intrinsic viscosity $[\eta]$ used here, 100 mg of an ethylene-based polymer resin is dissolved at 135° C. in 100 ml of tetralin containing only 5% by weight of 2,6-di-tert-butyl-4-methyl phenol (BHT) as a thermal degradation preventing agent to prepare a sample solution, and a relative viscosity ($\eta$rel) at 135° C. was calculated from the dropping times of the sample solution and a blank solution using an Ubbellohde viscometer. Then, the intrinsic viscosity $[\eta]$ was calculated according to the following equation.

$$[\eta] = 23.3 \times \log(\eta \text{rel})$$

The present invention is particularly useful in an ethylene-based polymer resin having relatively low MFR described above, and in the ethylene-based polymer resin of the present invention, the above-mentioned MFR is not less than 0.01 and less than 1 (g/10 min.), more preferably not less than 0.05 and less than 1 (g/10 min.), further preferably 0.1 to 0.8 (g/10 min.), and particularly preferably 0.2 to 0.8 (g/10 min.).

The ethylene-based polymer resin of the present invention has a density usually from not less than 890 and less than 970 (kg/m$^3$). The density used here means a value measured by a method defined in JIS K6760-1981. The density is preferably from 900 to 950 (kg/m$^3$), more preferably from 905 to 940 (kg/m$^3$), and a film obtained from the ethylene-based polymer resin is excellent in balance between rigidity and impact strength, preferably.

The ethylene-based polymer resin of the present invention has a molecular weight distribution of preferably 3.5 to 25, more preferably 3.6 to 20, most preferably from 3.7 to 15, from the standpoint of flowability. The molecular weight distribution means a value (Mw/Mn) obtained by dividing the weight-average molecular weight (Mw) by the number-average molecular weight (Mn) in terms of polystyrene obtained using a gel permeation chromatography measurement. When the molecular weight distribution is less than 3.5, extrusion torque is too high leading to deterioration of molding processability, undesirably, and on the other hand, when the molecular weight distribution is more than 25, low molecular weight components are contained in large amount, tending to cause problems such as fuming in molding, and the like, undesirably.

The gel permeation chromatography measurement is carried out under the following conditions:
(1) Apparatus: Waters 150C manufactured by Waters Co. Ltd.
(2) Separation column: TSK gel GMH-HT manufactured by TOSOH Corp.
(3) Measuring temperature: 145° C.
(4) Carrier: orth-dichlorobenzene
(5) Flow rate: 1.0 mL/min.
(6) Injected amount: 500 $\mu$L It is supposed that the ethylene-based polymer resin of the present invention has a polymer structure having a long chain branch, and it has an activation energy of its flow higher than that of conventional ethylene resins. The activation energy (Ea) (unit; kJ/mol) of flow is preferably larger than 40 kJ/mol, from the standpoint of flowability. Herein, the flow activation energy Ea means an index of moldability calculated, according to the Arrhenius' equation: $\log(a_T) = Ea/R(1/T - 1/T_0)$ (R represents gas constant, $T_0$ represents a standard temperature 463 K), from a shift factor ($a_T$) in shifting, based on the principal of temperature-time superposition, dynamic viscoelastic data at each temperature T (K) measured under the following conditions using a viscoelasticity measuring apparatus (Reometrics Mechanical Spectrometer RMS-800, manufactured by Reometrics). As the calculation soft ware, Rhios V.4.4.4 manufactured by Reometrics was used, and an Ea value when the correlation factor $r^2$ is 0.99 or more in approximating to a line in Arrhenius' type plot log ($a_T$)–(1/T) is adopted. Into the sample, an antioxidant such as Irganox 1076 (trade name, manufactured by Ciba Specialty Chemicals Limited.) is previously compounded in suitable amounts of 1000 ppm or more before used for measurement, and measurement is carried out always under nitrogen. The above-mentioned Ea is preferably 45 kJ/mol or more and more preferably 50 kJ/mol or more.

(1) Geometry: parallel plate, diameter 25 mm, plate distance: 1.5 to 2 mm
(2) Strain: 5%
(3) Shearing speed: 0.1 to 100 rad/sec
(4) Temperature: 190, 170, 150, 130° C.

Further, the ethylene-based polymer resin generally has a higher melt flow rate ratio (MFRR) compared to the conventional ethylene polymer resins and the MFRR is preferably 60 or more from the standpoint of flowability. Herein, the MFRR means a value obtained by dividing a melt flow rate value measured at 190° C. under a load of 211.82 N (21.60 Kg) by a melt flow rate value (MFR) measured under a load of 21.18 N (2.16 Kg) according to a method defined in JIS K7210-1995. High MFRR values of 60 or more means excellent moldability at low extrusion torque. In the above-mentioned melt flow rate measurement, a polymer into which an antioxidant had been previously compounded in a ratio of 1000 ppm or more was used in all cases.

The ethylene-based polymer resin of the present invention preferably has a melting point of 115° C. or higher, more preferably 118° C. or higher from viewpoint of thermal resistance.

In the ethylene-based polymer resin, when the resin has a density of 927 kg/m$^3$ or less, the polymer generally has at least two melting points. In this case, the maximum melting point (T max) is preferably 115° C. or higher, more preferably 118° C. or higher. Further, the resin may contain a melting component of 115° C. or higher, preferably 118° C. or higher even if the resin has only one melting point of lower than 115° C.

Herein, the melting point means, using a differential scanning calorimeter (DSC) (type DSC-7 manufactured by Perkin Elmer Co., Ltd.), a melting peak temperature observed in a DSC curve obtained by packing 8 to 12 mg of a sample in an aluminum pan, cooling it to 40° C. at rate of 5° C./min after maintained at 150° C. for 2 minutes, then heating it to 150° C. at rate of 5° C./min after maintained at 40° C. for 2 minutes. When a plurality of peaks exist, the highest melting peak temperature is a maximum melting point(Tmax). Further, with respect to the melting component of 115° C. or higher, it can be determined by confirming whether or not the DSC curve is extended to 115° C. or higher.

The ethylene-based polymer resin of the present invention as described above is obtained by copolymerizing ethylene with the α-olefin in the presence of hydrogen with a metallocene catalyst for olefin polymerization as shown in Examples described below.

The above-mentioned metallocene catalyst for olefin polymerization is a catalyst obtained by contact of a co-catalyst carrier(A), a bridging type bisindenylzirconium complex(B) and an organoaluminum compound(C), and the above-mentioned co-catalyst carrier (A) is preferably a carrier obtained by contact of diethylzinc(a), a fluorinated phenol(b), water(c) and silica(d), more preferably, by contact of diethylzinc(a), a fluorinated phenol(b), water(c), silica(d) and a disilazane(e) (e.g. trimethyldisilazane [((CH$_3$)$_3$Si)$_2$NH]). When the component (e) is used, a resin having further improved appearance is obtained favorably. Use amounts of the above-mentioned compounds (a), (b) and (c) are not particularly restricted, but when the molar ratio of the use amounts of the compounds is 1:y:z=(a):(b):(c), it is preferable that y and z substantially satisfy the following expression (3).

$$|2-y-2z| \leq 1 \qquad (3)$$

In the above-mentioned expression (3), y represents a number of preferably from 0.01 to 1.99, more preferably from 0.10 to 1.80, further preferably from 0.20 to 1.50, most preferably from 0.30 to 1.00.

Regarding the amount of (d) used for (a), the amount of zinc atoms derived from (a) contained in particles obtained by contact of (a) with (d), is preferably 0.1 mmol or more, more preferably from 0.5 to 20 mmol, based on the molar number of zinc atoms contained in 1 g of the resulted particles, therefore, it may be determined appropriately within the above-mentioned range.

Further, when (e) is used, the used amount of (e) is up to 20 mmol per g of (d), preferably 0.1 to 20 mmol, more preferably 0.5 to 20 mmol.

Specific examples of the above-mentioned bridging type bisindenylzirconium complex (B) include racemi-ethylenebis(1-indenyl)zirconium dichloride, racemi-ethylenebis(1-indenyl)zirconium diphenoxide and the like.

As the above-mentioned organoaluminum compound (C), triisobutylaluminum and tri-n-octylaluminum are preferably used.

The amount of the component (B) used is preferably 5×10$^{-6}$ to 5×10$^{-4}$ mol based on 1 g of the component (A). Regarding the use amount of the component (C), the molar ratio (C)/(B) of an aluminum atom in the component (C) to a zirconium atom in the component (B) is preferably from 1 to 2000.

As the polymerization method, a polymerization methods accompanying formation of ethylene-based polymer particles, such as, for example, a gas phase polymerization, slurry polymerization, bulk polymerization and the like are preferable. In detail, this polymerization may be advantageously conducted according to known polymerization methods and polymerization conditions, but is not limited thereto. It is preferable that, before performing polymerization (real polymerization), pre-polymerization as shown in Examples is conducted, and the resulted pre-polymerized catalyst component is used as a catalyst component or a catalyst in the real polymerization. As a gas phase polymerization reaction apparatus, a fluidized-bed type reaction vessel, preferably, a fluidized-bed type reaction vessel having an enlarged portion is used. A reaction apparatus having a stirring blade equipped in a reaction vessel can be used without any problem.

As the method of feeding components to a polymerization vessel, there can be used methods in which components are usually fed under a moisture-free condition using an inert gas (e.g. nitrogen, argon), hydrogen, ethylene or the like, alternatively, components may be dissolved or diluted in a solvent, and fed in the form of solution or slurry. Catalyst components may be individually fed, or any components may be previously placed into contact with in any order before feeding.

Regarding the polymerization conditions, the temperature is lower than a temperature at which a polymer is melted, preferably in a range from 0° C. to 150° C., particularly preferably in a range from 30° C. to 100° C. Further, for the purpose of controlling the melt flowability of the final product, hydrogen may be added as a molecular weight controlling agent. Furthermore, in polymerization, an inert gas may be allowed to co-exist in a mixed gas.

From the viewpoint of appearance such as surface smoothness, gloss and transparency of an extruded article such as a film, sheet, etc., the ethylene-based polymer resin of the present invention is preferably a one in which a chain length (A) of a peak of a logarithmic normal distribution curve corresponding to a component of the highest molecular weight among at least two logarithmic normal distribution curves obtained by dividing a chain length distribution curve obtained by a gel permeation chromatography measurement of the resin, and the MFR satisfy a relation of the following expression (3):

$$3.30 < \log A < -0.0815 \times \log(MFR) + 4.05 \quad (3)$$

The ethylene-based polymer resin of the present invention has a low extrusion torque, and is excellent in extrusion moldability, further appearance of the extruded article such as a film since the resin satisfies the relation of the above expression (3). In the expression (3), when the relation, $3.30 < \log A$, is not satisfied, the extrusion moldability may become poor because of decrease of melt tension. On the other hand, when the relation, $\log A < -0.0815 \times \log(MFR) + 4.05$, is not satisfied, the extrusion torque may become higher and the extrusion moldability may become poor, further the appearance may become inferior.

As the relation expression satisfied by the ethylene-based polymer resin of the present invention, $$3.30 < \log A < -0.0815 \times \log(MFR) + 4.03$$

is preferable, and $$3.30 < \log A < -0.0815 \times \log(MFR) + 4.02$$

is further preferable.

The division of the chain length distribution curve is carried out as described below.

First, a chain length distribution curve in which the X axis of log Aw to the Y axis of weight proportion dW/d(log Aw) is plotted, is measured by a gel permeation chromatography measurement of the resin. The number of plotted data is usually at least 300 to obtain a continuous distribution curve. Next, a composite curve is prepare by adding four logarithmic normal distribution curves (x-y curves) having a standard deviation of 0.30 and an arbitrary average value (usually the value corresponds to the chain length A of the peak position), in arbitrary ratios. Then, the average value and ratio are determined so that the sum of the square of the deviation of the y values to the same x values of the chain length distribution curve prepared by plotting the measurement values and the composite curves, becomes minimum. The minimum value of the sum of the square of the deviation is usually 0.5% or less to the sum of the square of the deviation when all rates of each peaks are zero. Further, when the average value and the ratio providing the minimum value of the square of the deviation, are obtained, log A is calculated from the chain length A of the peak position of logarithmic normal distribution curve corresponding to the highest molecular weight component among four logarithmic normal distribution curves obtained by dividing into 4. The rate of the peak of the logarithmic normal distribution curve corresponding to the highest molecular weight component is usually 10% or more.

It is known that in ethylene polymer resins, the flowability increases with increase of MFR, in other words, the relaxation time become short with decrease of melt viscosity. It is supposed that the ethylene-based polymer resins of the present invention has a polymer structure such as a long chain branch, and it has a relaxation time of a proper range longer than that of conventional ethylene polymer resins, and is preferably a one in which the characteristic relaxation time at 190° C.($\tau$)(unit; second) and the MFR satisfy a relation of the following expression (4):

$$2 < \tau < 8.1 \times MFR^{-0.746} \quad (4)$$

The ethylene-based polymer resin of the present invention has a low extrusion torque, and is excellent in extrusion moldability, further appearance of the extruded article such as a film since the resin satisfies the relation of the above expression (4). In the expression (4), when the relation, $2 < \tau$, is not satisfied because of too short relaxation time, the extrusion moldability may become poor because of decrease of melt tension. On the other hand, when the relation, $\tau < 8.1 \times MFR^{-0.746}$, is not satisfied, the extrusion torque may become higher and the extrusion moldability may become poor, further the appearance may become inferior.

As the relation expression satisfied by the ethylene-based polymer resin of the present invention, $$2 < \tau < 7.9 \times MFR^{-0.746}$$

is preferable, and $$2 < \tau < 7.8 \times MFR^{-0.746}$$

is further preferable.

The characteristic relaxation time at 190° C.($\tau$) can be determined by the followings:

Using Rheometrics Mechanical Spectrometer RMS-800 manufactured by Rheometrics Co., Ltd. as a viscoelasticity measuring equipment, viscoelasticity data obtained by measuring at various temperatures are shifted based on the principle of temperature-time superposition to obtain a master curve showing a dependency of a dynamic viscosity($\eta$) (unit; Pa.sec) at 190° C. on a share rate($\omega$)(unit: rad/sec). And, the relaxation time at 190° C. ($\tau$) is a numeral value calculated in approximation of the master curve using the Cross' equation below:

Cross' approximation equation $$\eta = \eta 0 / [1 + (\tau \times \omega)^n]$$

($\eta^0$ and n are respectively a constant determined depending on each ethylene-$\alpha$-olefin copolymer used in measurement as similar with the characteristic relaxation time($\tau$)).

Further, as a calculation soft ware for preparation of the master curve and approximation of the Cross' equation, Rhios V4.4.4 (made by Rheometrics Co., Ltd.) is used.

The ethylene-based polymer resin of the present invention preferably has a molecular weight distribution (Mw/Mn) of 4 to 20, more preferably 7.5 to 17 from the viewpoint of flowability, and 80 or more of the melt flow ratio(MFRR) is more preferred.

From the viewpoint of further improvement of the extrusion moldability, the ethylene-based polymer resin of the present invention preferably has an activation energy of flowability(Ea) of 60 to 100 kJ/mol, more preferably 63 to 90 kJ/mol, most preferably 66 to 90 kJ/mol. When the Ea is less than 60 kJ/mol, sufficient improvement in extrusion moldability is not accomplished because the melt tension at low temperature difficultly raises, and, on the other hand, when the Ea is more than 100 kJ/mol, sufficient improvement in extrusion moldability is not also accomplished because decrease of the melt viscosity at high temperature is too large.

From the viewpoint of further improvement of the extrusion moldability, in the ethylene-based polymer resin of the present invention, a swelling ratio(SR) and [$\eta$](dL/g) described above preferably satisfy a relation of the following expression (5) or (6):

$$\text{When } [\eta] < 1.20, -0.91 \times [\eta] + 2.262 < SR < 2 \quad (5)$$

$$\text{when } [\eta] \geq 1.20, 1.17 < SR < 2 \quad (6)$$

Further,
When $[\eta]<1.23$, $-0.91\times[\eta]+2.289<SR<1.9$, or
when $[\eta]\geq 1.23$, $1.17<SR<1.9$, is more preferable, and
When $[\eta]<1.30$, $-0.91\times[\eta]+2.353<SR<1.8$, or
when $[\eta]\geq 1.30$, $1.17<SR<1.8$, is most preferable.

When the SR is beyond the above range, a further improvement of a stability during molding, for example, bubble stability during an inflation molding is not accomplished.

The swelling ratio(SR) was determined as follows: In the measurement of the MFR described above, a solid strand was obtained by extruding a strand of a resin sample from an orifice of diameter of 2.095 mm($D_0$) at 190° C. under a load of 21.18 N (2.16 kg), then cooling the strand in air to solidify it. The diameter (D) of a point between 1 and 6 mm from the front end of the solid strand is measured. SR is determined as $D/D_0$.

The diameter (D) was determined as an average value of three strand samples.

The ethylene-based polymer resin of the present invention, which has a structure which is supposed that long chain branches in polymer molecules are closely entangled each other, are produced by copolymerizing ethylene and an α-olefin using the metallocene catalyst for olefin polymerization in the presence of hydrogen to obtain a resin, then conducting mixing methods as mentioned below. One of them is a method of producing a pellet-like resin by extruding continuously strands using an extruder equipped with an extensional flow mixing die developed by Utracki et al.(see U.S. Pat. No. 5,451,106), then cutting continuously the strands. Another one is a method of producing a pellet-like resin by extruding continuously a strands of a resin using an extruder equipped with a twin screw rotating different directions each other having a gear pump, and a die, then cutting continuously the strands. In the latter method, the extruder preferably has a residence part of the melt resin between the screw part and the die.

The ethylene-based polymer resin of the present invention is suitable as a raw material of molded articles such as films, sheets and the like since it has excellent properties as described above. Particularly, it is suitably used as a raw material of a film obtained by inflation molding, and of a film or sheet obtained by T die film molding and the like.

The ethylene-based polymer resin of the present invention may contain known additives such as antioxidants, weathering agents, lubricants, anti-blocking agents, anti-static agents, fogging preventing agents, non-dropping agents, pigments, fillers and the like.

As described above, according to the present invention, ethylene-based polymers having excellent processabilities and mechanical properties can be provided. Further, the present invention can provide ethylene-based polymers excellent in extrusion moldability and appearance of extruded articles.

EXAMPLE

The present invention will be explained in detail using the following Examples, but is not limit thereto.

The measurement of physical and mechanical properties was carried out by a measuring methods described above and below.
(1) Tensile Impact Strength was Measured Based on ASTM D1822-68.
(2) Film Forming by Inflation Molding Using a single screw extruder (full-flight type, 30 mmφ, L/D=28), a dice (50 mmφ, 0.8 mm of lip gap) and a double slit air ring, manufactured by Placo Limited, various ethylene polymer samples were film-formed at a molding temperature of 170° C., an extrusion rate of 5.5 kg/hr, frost-line distance(FLD) of 200 mm and blowing ratio of 1.8 to obtain a film in 80 μm-thick.
(3) Haze A haze value of the film obtained in the above (2) was measured according to ASTM D1003. The smaller value shows the more excellent transparency.
(4) Babble Stability In the film forming described above (2), stability of an inflation babble was observed visually and evaluated below:
◎; Extremely excellent
○; Excellent
Δ; Somewhat unstable
X; Unstable Example 1

Preparation of Catalyst Component

Into a 5 liter four-necked flask purged with nitrogen was charged 1.5 liter of tetrahydrofuran and 1.35 liter (2.7 mol) of a hexane solution of diethylzinc (2 mol/liter) and the mixture was cooled to 5° C. A solution prepared by dissolving 0.2 kg (1 mol) of pentafluorophenol in 500 ml of tetrahydrofuran was added drop wise to this over 60 minutes. After completion of dropping, the mixture was stirred at 5° C. for 60 minutes, and the temperature was raised to 45° C. over 28 minutes, and stirring thereof was conducted for 60 minutes. Then, the temperature was lowered to 20° C. with an ice bath, and 45 g (2.5 mol) of water was dropped over 90 minutes. Then, the mixture was stirred at 20° C. for 60 minutes, and the temperature was raised to 45° C. over 24 minutes, and stirring thereof was carried out for 60 minutes. Then, the solvent was distilled under reduced pressure for 120 minutes while raising temperature from 20° C. to 50° C., thereafter, drying under reduced pressure was performed at 120° C. for 8 hours. As a result, 0.43 kg of a solid product was obtained.

Into a 5 liter four-necked flask purged with nitrogen was charged 0.43 kg of the above-mentioned solid product and 3 liter of tetrahydrofuran, and the mixture was stirred. To this was added 0.33 kg of silica (Sylopol 948 manufactured by Davison Co., Ltd.; average particle size=61 μm; pore volume=1.61 ml/g; specific surface area=296 m$^2$/g) which had been heat-treated at 300° C. under nitrogen flow. The mixture was heated to 40° C. and stirred for 2 hours, then, allowed to stand still to precipitate a solid component, and when the interface between a layer of the precipitated solid component and an upper layer, slurry portion was observed, the upper layer, slurry portion was removed. For washing, to this was added 3 liter of tetrahydrofuran, and the mixture was stirred, then, allowed to stand still, to precipitate the solid component, and when the interface was observed in the same manner as described above, an upper layer, slurry portion was removed. The above-mentioned washing operation was repeated five times. Then, drying at 120° C. was conducted for 8 hours under reduced pressure, to obtain 0.52 kg of a co-catalyst carrier (A).

Preparation of Pre-polymerized Catalyst

Into a previously nitrogen-purged autoclave having a content volume of 210 liter equipped with a stirrer was charged 80 liter of butane containing triisobutylaluminum in a concentration of 2.5 mmol/liter and 28 liter of hydrogen of normal temperature and normal pressure, then, the autoclave was heated up to 40° C. Further, ethylene was charged in an amount giving a gas phase pressure of 0.3 MPa in the autoclave, and after the system was stabilized, 200 mmol of triisobutylaluminum, 28 mmol of racemi-ethylenebis(1- indenyl)zirconium diphenoxide, subsequently, 203 g of the above-mentioned co-catalyst carrier (A) were added, to initiate polymerization. During the first one hour, ethylene was fed at a rate of 0.9 kg/hr and hydrogen of normal temperature and normal pressure was fed at a rate of 3.2 liter/hr, and the polymerization temperature was raised from 40° C. to 50° C. over 30 minutes from 1 hour after addition of the above-mentioned co-catalyst carrier (A). Further, from 1 hour after addition of the component (B), ethylene was fed at a rate of 4.5 kg/hr and hydrogen of normal temperature and normal pressure was fed at a rate of 9.4 liter/hr, and polymerization was conducted at 50° C. Thus, previous polymerization for 4 hours in total was performed. After completion of polymerization, ethylene, butane and hydrogen gas were purged, then, the solvent was filtrated, and the produced solid was dried under reduced pressure at room temperature, to obtain a previously polymerized catalyst component in which 55.5 g of polyethylene had been previously polymerized per 1 g of the above-mentioned co-catalyst carrier (A).

Polymerization and Mixing

Using the previously polymerized catalyst component obtained above, copolymerization of ethylene and 1-hexene was conducted in a continuous mode fluidized bed gas phase polymerization apparatus. The polymerization conditions included a temperature of 85° C., a total pressure of 2 MPa, a gas linear velocity of 0.24 m/sec, a molar ratio of hydrogen to ethylene of 0.28% and a molar ratio of 1-hexene to ethylene of 1.8%, and during the polymerization, ethylene, 1-hexene and hydrogen were continuously fed to maintain the gas composition constant. The above-mentioned previously polymerized catalyst component was fed at a rate of 0.16 kg/hr and triisobutylaluminum was fed continuously at a rate of 75 mmol/hr, continuously, and an ethylene/1-hexene copolymer was obtained at a production efficiency of 19 kg/hr in an average polymerization time of 4 hr so as to maintain the total powder weight in the fluidized bed at a constant value of 80 kg.

Calcium stearate of 1000 ppm by weight and Sumilizer GP (stabilizer manufactured by Sumitomo Chemical Co., Ltd.) of 1800 ppm by weight were blended to thus obtained ethylene/1-hexene copolymer powder, then pelletizing the mixture using a full-flight type single screw extruder (manufactured by Tanabe Plastic Co., Limited, 40 mm$\phi$, L/D=28) under conditions of 150° C. and screw rotation of 80 rpm. Thus obtained ethylene-based polymer resin showed physical properties as shown in Table 1.

Example 2

An ethylene/1-hexene copolymer was obtained in the same manner as in Example 1 except that a pre-polymerized catalyst component in which polyethylene had been pre-polymerized at a proportion of 48.2 g per 1 g of the co-catalyst carrier (A) was-used, the gas linear velocity was changed to 0.34 m/sec, the molar ratio of hydrogen to ethylene was changed to 0.10%, the molar ratio of 1-hexene to ethylene was changed to 1.9%, the feeding rate of the above-mentioned previously polymerized catalyst component was changed to 0.12 kg/hr, and the feeding rate of triisobutylaluminum was changed to 27 mmol/hr. The resulted ethylene-based polymer resin showed physical properties as shown in Table 1.

Example 3

Preparation of Catalyst Component (1) Treatment of Silica

Into a 3 liter four-necked flask purged with nitrogen was charged 0.2 kg of silica (Sylopol 948 manufactured by Davison Co., Ltd. which had been heat-treated at 300° C. under nitrogen flow next, 1.2 liters of toluene was charged therein while washing silica attached to an inner wall of the flask. After cooled to 5° C., a mixed solution of 84.4 ml of 1,1,1,3,3,3-hexamethyldisilazane and 115 ml of toluene was added dropwise thereto over 25 minutes. After completion of dropping, the resulting mixture was stirred at 5° C. for 1 hr, and additional at 95° C. for 3 hrs, and filtered to obtain a solid. Thereafter, 1.2 liters of toluene was added, then allowed to stand over night to prepare a slurry.

(2) Synthesis of Co-catalyst Carrier (A')

0.55 Liter (1.10 mol) of a hexane solution of diethylzinc (2.00 mol/liter) was added to the slurry obtained in the above (1), and the mixture was cooled to 5° C. A solution prepared by dissolving 105 g (0.570 mol) of pentafluorophenol in 173 ml of toluene was added dropwise to this over 65 minutes. After completion of dropping, the mixture was stirred at 5° C. for 60 minutes, and the temperature was raised to 40° C., and stirring thereof was conducted for 1 hr. Then, the temperature was lower to 5° C. with an ice bath, and 14.9 g (0.828 mol) of water was dropped over 90 minutes. After dropping, the mixture was stirred at 5° C. for 1.5 hr, and then at 40° C. for 2 hr. Thereafter, resulting mixture was allowed to stand at room temperature over night. Thereafter, the mixture was stirred at 80° C. for 2 hours, then, allowed to stand still to precipitate a solid component, and when the interface between a layer of the precipitated solid component and an upper layer, slurry portion was observed, the upper layer, slurry portion was removed, then the remaining liquid component was filtered to obtain a solid. 1.7 Liters of toluene were added, the the mixture was stirred at 95° C. for 2 hr. Thereafter, washing operations described below were conducted 4 times with each 1.7 liters of toluene at 95° C., and 2 times each 1.7 liters of hexane at room temperature. The washing operation is as follows: the solvent is added to the solid, the mixture was stirred, then, allowed to stand still, to precipitate the solid component, when the interface was observed, an upper layer, slurry portion was removed, and then the remaining liquid component was filtered to obtain a solid.

Then, the finally obtained solid was dried at room temperature for 3 hours under reduced pressure, to obtain 0.39 kg of a co-catalyst(A').

Preparation of Pre-polymerized Catalyst

A pre-polymerization was conducted in the same manner as in Example 1 except that 400 g of the co-catalyst(A') was used, 6 liters of hydrogen was used, the ethylene pressure was 0.12 MPa, 60 mmol of racemi-ethylenebis(1-indenyl) zirconium diphenoxide was used, and the pre-polymerization temperature was 30° C., to obtain a pre-polymerized catalyst component in which 34 g of ethylene per g of the co-catalyst(A') was pre-polymerized.

Polymerization

Using the pre-polymerized catalyst component obtained above, copolymerization of ethylene and 1-hexene was conducted in a continuous mode fluidized bed gas phase polymerization apparatus except that the molar ratio of hydrogen to ethylene was changed to 0.47% and the molar ratio of 1-hexene to ethylene was changed to 1.6%, to obtain an ethylene-1-hexene copolymer powder.

Mixing

Calcium stearate of 1000 ppm by weight and Sumilizer GP (stabilizer manufactured by Sumitom Chemical Co., Ltd.) of 1800 ppm by weight were blended to thus obtained ethylene/1-hexene copolymer powder, then the mixture was kneaded and then pelletized using a LCM100 extruder (manufactured by Kobe Steel Ltd.) under conditions of a feed rate of 350 kg/hr, screw rotation of 450 rpm, gate opening degree of 4.2 mm, suction pressure of 0.2 MPa and resin temperature of 200 to 230° C. Thus obtained ethylene-based polymer resin exhibited physical properties and film extrusion moldability as shown in Table 1.

Example 4

An ethylene-1-butene-1-hexene copolymer was obtained in the same manner as in Example 3 except that a pre-polymerized catalyst component in which 13 g of ethylene per g of the co-catalyst carrier (A') was pre-polymerized, was used, the temperature was changed to 75° C., the molar ratio of hydrogen to ethylene was changed to 0.54%, the molar ratio of 1-hexene to ethylene was changed to 0.33%, and 1-butene in the molar ratio of 1-butene to ethylene of 2.4% was used, to obtain an ethylene-1-butene-1-hexene copolymer. Thus obtained ethylene polymer resin exhibited physical properties and film extrusion moldability as shown in Table 1.

Example 5

An ethylene-1-butene-1-hexene copolymer was obtained in the same manner as in Example 3 except that a pre-polymerized catalyst component in which 11 g of ethylene per g of the co-catalyst carrier (A') was pre-polymerized, was used, the molar ratio of hydrogen to ethylene was changed to 0.54%, the molar ratio of 1-hexene to ethylene was changed to 0.33%, and 1-butene in the molar ratio of 1-butene to ethylene of 2.4% was used, to obtain an ethylene-1-butene-1-hexene copolymer. Thus obtained ethylene polymer resin exhibited physical properties and film extrusion moldability as shown in Table 1.

Example 6

An ethylene-1-hexene copolymer was obtained in the same manner as in Example 3 except that a pre-polymerized catalyst component in which 13 g of ethylene per g of the co-catalyst carrier (A') was pre-polymerized, was used, the molar ratio of hydrogen to ethylene was changed to 0.39%, and the molar ratio of 1-hexene to ethylene was changed to 0.79%, to obtain an ethylene-1-butene-1-hexene copolymer. Thus obtained ethylene polymer resin exhibited physical properties and film extrusion moldability as shown in Table 1.

Comparative Examples 1 to 2

High pressure LDPE F102-0 (manufactured by Sumitomo Chemical Co., Ltd.) produced by a radical polymerization method was excellent in balance between melt tension and extrusion torque, as summarized in Table 1, however, it has extremely low maximum taking up velocity value and has low mechanical strength. And, FA101-0 (manufactured by Sumitomo Chemical Co., Ltd.), conventional linear low density polyethylene, was relatively excellent in impact strength and maximum taking up velocity, as summarized in Table 1, however, it has low melt tension value.

As shown in Table 1, the ethylene-based polymer resin of the present invention is excellent in processing balance between melt tension and maximum taking up velocity, and excellent also in mechanical strength.

TABLE 1

|  | Example | | | | | | Comparative Example | |
| --- | --- | --- | --- | --- | --- | --- | --- | --- |
|  | 1 | 2 | 3 | 4 | 5 | 6 | 1 | 2 |
| Melt flow rate MFR (g/10 min) | 0.78 | 0.57 | 0.54 | 0.22 | 0.39 | 0.60 | 0.32 | 0.85 |
| Melt tension (cN) | 3.7 | 4.0 | 5.4 | 5.4 | 6.0 | 3.7 | 15 | 1.8 |
| Expression(1) left side | 2.3 | 2.8 | 2.9 | 4.9 | 3.5 | 2.7 | 3.9 | 2.2 |
| Expression(1) right side | 4.2 | 5.2 | 5.4 | 9.8 | 6.7 | 5.0 | 7.6 | 4.0 |
| Intrinsic viscosity [η] (dl/g) | 1.20 | 1.35 | 1.15 | 1.27 | 1.19 | 1.16 | 1.07 | 1.73 |
| Expression(2) left side | 1.04 | 1.08 | 1.08 | 1.18 | 1.11 | 1.07 | 1.14 | 1.04 |
| Expression(2) right side | 1.56 | 1.64 | 1.65 | 1.90 | 1.74 | 1.62 | 1.79 | 1.54 |
| Log A | 4.07 | 4.11 | 4.06 | 4.06 | 3.99 | 4.07 | — | — |
| Expression(3) right side | 4.06 | 4.07 | 4.07 | 4.10 | 4.08 | 4.07 | 4.09 | 4.06 |
| τ (sec) | 10.0 | 15.4 | 9.4 | 12.9 | 6.2 | 10.8 | 8.1 | 0.2 |
| Expression(4) right side | 9.8 | 12.3 | 12.8 | 25.1 | 16.4 | 11.9 | 19.0 | 9.1 |
| Ea (KJ/mol) | 53 | 56 | 75 | 70 | 73 | 66 | 70 | 31 |
| SR | 1.20 | 1.14 | 1.34 | 1.18 | 1.31 | 1.22 | 1.41 | 1.18 |
| Expression(5) left side | 1.17 | 1.17 | 1.22 | 1.17 | 1.18 | 1.21 | 1.29 | 1.17 |
| Mw/Mn | 5.3 | 3.9 | 9.8 | 10.1 | 5.9 | 10.5 | 4.4 | 3.4 |
| Density (kg/cm$^3$) | 922.4 | 920.7 | 917.8 | 919.8 | 905.2 | 931.2 | 921.4 | 919.7 |
| MFRR | 85 | 76 | 106 | 203 | 98 | 108 | 94 | 30 |
| Maximum melting point (T max)(° C.) | 120.8 | 120.0 | 114.6 | 104.1 | 113.5 | 121.0 | 109.2 | 117.5 |
| Melting component at higher than 118° C. | Exsistence | Exsistence | Exsistence | Exsistence | Exsistence | Exsistence | None | Exsistence |
| Maximum taking up velocity (m/min) | 25 | 24 | 21 | 21 | 20 | 45 | 4 | 93 |

TABLE 1-continued

|  | Example | | | | | | Comparative Example | |
| --- | --- | --- | --- | --- | --- | --- | --- | --- |
|  | 1 | 2 | 3 | 4 | 5 | 6 | 1 | 2 |
| Tensile impact strength (kJ/m$^2$) | 1070 | 1220 | 1150 | 820 | 1420 | 890 | 410 | 780 |
| Haze (%) | 14 | 15 | 9 | 10 | 3 | 15 | 15 | — |
| Bubble stability | ○ | ○ | ◎ | ◎ | ◎ | ○ | ◎ | X |

What is claimed is:

1. An ethylene-based polymer resin which is obtained by copolymerizing ethylene with an α-olefin having 5 to 20 carbon atoms, and has a melt flow rate (MFR) measured at 190° C. under a load of 21.18 N according to JIS K7210-1995, of not less than 0.01 g/10 min. and less than 1 g/10 min., wherein the melt flow rate and a melt tension(MT) at 190° C. (unit: cN) of the resin satisfy a relation of the following expression (1), and an intrinsic viscosity [η] (unit: dL/g) and the melt flow rate of the resin satisfy a relation of the following expression (2):

$$2 \times MFR^{-0.59} < MT < 3.6 \times MFR^{-0.66} \quad (1)$$

$$1.02 \times MFR^{-0.094} < [\eta] < 1.50 \times MFR^{-0.156} \quad (2).$$

2. The ethylene-based polymer resin according to claim 1, wherein a chain length (A) of a peak of a logarithmic normal distribution curve corresponding to a component of the highest molecular weight among at least two logarithmic normal distribution curves obtained by dividing a chain length distribution curve obtained by a gel permeation chromatography measurement of the resin, and the MFR satisfy a relation of the following expression (3):

$$3.30 < \log A < -0.0815 \times \log(MFR) + 4.05 \quad (3).$$

3. The ethylene-based polymer resin according to claim 1 or 2, wherein a characteristic relaxation time (τ)(unit: second) measured at 190° C. of the resin and the MFR satisfy a relation of the following expression (4):

$$2 < \tau < 8.1 \times MFR^{-0.746} \quad (4).$$

4. The ethylene-based polymer resin according to any one of claims 1 or 2, wherein the resin has a an activation energy for flow of 60 kJ/mol or more.

5. The ethylene-based polymer resin according to any one of claims 1 or 2, wherein a swelling ratio (SR) of the resin and the intrinsic viscosity [η] satisfy a relation of the following expression (5) or (6):

when the [η] is less than 1.20(dL/g), $-0.91 \times [\eta] + 2.262 < SR < 2$ (5)

when the [η] is 1.20 or more, $1.17 < SR < 2$ (6).

6. The ethylene-based polymer resin according to claim 3, wherein the resin has an activation energy for flow of 60 kJ/mol or more.

7. The ethylene-based polymer resin according to claim 3, wherein a swelling ratio (SR) of the resin and the intrinsic viscosity [η] satisfy a relation of the following expression (5) or (6):

when the [η] is less than 1.20 (dL/g), $-0.91 \times [\eta] + 2/262 < SR < 2$ (5)

when the [η] is 1.20 or more, $1.17 < SR < 2$ (6).

8. The ethylene-based polymer resin according to claim 4, wherein a swelling ratio (SR) of the resin and the intrinsic viscosity [η] satisfy a relation of the following expression (5) or (6):

when the [η] is less than 1.20 (dL/g), $-0.91 \times [\eta] + 2/262 < SR < 2$ (5)

when the [η] is 1.20 or more, $1.17 < SR < 2$ (6).

9. The ethylene-based polymer resin according to claim 6, wherein a swelling ratio (SR) of the resin and the intrinsic viscosity [η] satisfy a relation of the following expression (5) or (6):

when the [η] is less than 1.20 (dL/g), $-0.91 \times [\eta] + 2/262 < SR < 2$ (5)

when the [η] is 1.20 or more, $1.17 < SR < 2$ (6).

* * * * *